(12) United States Patent
Coots et al.

(10) Patent No.: US 12,372,939 B2
(45) Date of Patent: Jul. 29, 2025

(54) MANUFACTURING A WORKPIECE USING OPTICAL DIMENSIONING

(71) Applicant: CORNING INCORPORATED, Corning, NY (US)

(72) Inventors: Dana Eugene Coots, Tioga, PA (US); Matthew Ellery Cornelius, Wellsville, NY (US); Daniel Charles Loucks, Big Flats, NY (US); Eric Daniel Treacy, Beaver Dams, NY (US)

(73) Assignee: CORNING INCORPORATED, Corning, NY (US)

( * ) Notice: Subject to any disclaimer, the term of this patent is extended or adjusted under 35 U.S.C. 154(b) by 414 days.

(21) Appl. No.: 17/616,372

(22) PCT Filed: Jun. 17, 2020

(86) PCT No.: PCT/US2020/038017
§ 371 (c)(1),
(2) Date: Dec. 3, 2021

(87) PCT Pub. No.: WO2020/263634
PCT Pub. Date: Dec. 30, 2020

(65) Prior Publication Data
US 2022/0317651 A1    Oct. 6, 2022

Related U.S. Application Data

(60) Provisional application No. 62/868,750, filed on Jun. 28, 2019.

(51) Int. Cl.
*G05B 19/18* (2006.01)
*B29C 48/30* (2019.01)
(Continued)

(52) U.S. Cl.
CPC ........ *G05B 19/188* (2013.01); *B29C 48/3001* (2019.02); *B29C 48/92* (2019.02);
(Continued)

(58) Field of Classification Search
None
See application file for complete search history.

(56) References Cited

U.S. PATENT DOCUMENTS

| | | | | |
|---|---|---|---|---|
| 3,947,214 A | * | 3/1976 | Cunningham | B29C 48/32 425/467 |
| 5,463,462 A | * | 10/1995 | Ohnishi | G01N 21/95623 356/521 |

(Continued)

FOREIGN PATENT DOCUMENTS

| CN | 106735869 A | 5/2017 |
|---|---|---|
| CN | 107649947 A | 2/2018 |

(Continued)

OTHER PUBLICATIONS

International Search Report and Written Opinion of the International Searching Authority; PCT/US2020/038017; dated Sep. 25, 2020; 13 pages; European Patent Office.

*Primary Examiner* — Jason Lin
(74) *Attorney, Agent, or Firm* — Kevin M. Able; Russell S. Magaziner

(57) ABSTRACT

An apparatus and method for manufacturing a workpiece using optical dimensioning. The apparatus comprises a tool configured to alter at least one feature of the workpiece. An imaging system is coupled to the tool and defines an optical axis. The imaging system is configured to capture a plurality of images of the at least one feature of the workpiece. A controller comprises one or more processors. The controller is configured to analyze the plurality of images to determine measured dimensions of the at least one feature of the workpiece. The controller is further configured to define a (Continued)

three-dimensional path for operating the tool by applying a predefined modification to the measured dimensions of the at least one feature of the workpiece.

20 Claims, 10 Drawing Sheets

(51) Int. Cl.
  *B29C 48/92*    (2019.01)
  *G05B 19/401*   (2006.01)
  *G06T 7/00*     (2017.01)
  *G06T 7/60*     (2017.01)

(52) U.S. Cl.
  CPC .......... *G05B 19/401* (2013.01); *G06T 7/0006* (2013.01); *G06T 7/60* (2013.01); *G05B 2219/45204* (2013.01); *G05B 2219/50064* (2013.01); *G06T 2207/30164* (2013.01)

(56) References Cited

U.S. PATENT DOCUMENTS

| | | | |
|---|---|---|---|
| 5,956,253 A | 9/1999 | Gottschalk | |
| 7,366,340 B1* | 4/2008 | Smithgall | G01N 21/95692 428/116 |
| 7,497,999 B2* | 3/2009 | Ichikawa | B01D 46/0036 428/116 |
| 8,244,497 B2* | 8/2012 | Folmar | B23H 9/00 702/170 |
| 8,421,857 B2* | 4/2013 | Akao | G01N 21/95692 348/92 |
| 9,027,218 B2 | 5/2015 | Slettemoen | |
| 9,523,623 B2* | 12/2016 | Blanchard | G01M 3/20 |
| 9,724,876 B2* | 8/2017 | Cheverton | B29C 64/393 |
| 9,919,428 B2 | 3/2018 | Anducas Aregall et al. | |
| 10,145,805 B2* | 12/2018 | Stanford | G01N 21/95692 |
| 11,287,389 B2* | 3/2022 | Madara | G01N 21/95692 |
| 2003/0174320 A1* | 9/2003 | Yokoyama | G01N 21/9515 356/237.6 |
| 2006/0151926 A1* | 7/2006 | Zoeller, III | B28B 11/006 264/603 |
| 2007/0019213 A1* | 1/2007 | Vaidyanathan | G06T 7/73 356/626 |
| 2007/0091309 A1* | 4/2007 | Kondo | G06T 7/0004 356/364 |
| 2007/0132988 A1* | 6/2007 | Gargano | G01N 21/95692 356/237.6 |
| 2008/0225302 A1 | 9/2008 | Nagatoshi et al. | |
| 2010/0045975 A1* | 2/2010 | Zoeller, III | G01N 21/95692 356/239.2 |
| 2010/0164131 A1* | 7/2010 | Bookbinder | B08B 9/00 264/39 |
| 2010/0238284 A1* | 9/2010 | Akao | G01B 11/26 348/E7.091 |
| 2011/0116704 A1* | 5/2011 | Zoeller, III | G01N 21/95692 382/141 |
| 2011/0128370 A1* | 6/2011 | Booth | G01N 21/952 348/125 |
| 2011/0206896 A1* | 8/2011 | Humphrey | B29C 48/11 428/116 |
| 2015/0025667 A1 | 1/2015 | Shindo et al. | |
| 2015/0328773 A1 | 11/2015 | Boca et al. | |
| 2016/0299487 A1 | 10/2016 | Scott, Jr. | |
| 2018/0024525 A1 | 1/2018 | Inoue | |
| 2018/0308014 A1 | 10/2018 | White et al. | |

FOREIGN PATENT DOCUMENTS

WO    2006/062851 A1    6/2006
WO    2020/146245 A2    7/2020

* cited by examiner

MANUFACTURING A WORKPIECE USING OPTICAL DIMENSIONING

CROSS-REFERENCE TO RELATED APPLICATIONS

This is a national stage application under 35 U.S.C § 371 of International Application No. PCT/US2020/038017, filed on Jun. 17, 2020, which claims the benefit of priority under 35 U.S.C § 120 of U.S. Provisional Application Ser. No. 62/868,750 filed on Jun. 28, 2019, the content of which is relied upon and incorporated herein by reference in its their entireties.

BACKGROUND

Honeycomb bodies are often used in particulate filters and catalytic converters for treating or removing pollutants from a gas flow such as engine combustion exhaust. The process of manufacturing the honeycomb bodies may include extruding a ceramic-forming material through an extrusion die.

SUMMARY

Various approaches are described herein for, among other things, providing methods and systems for manufacturing a honeycomb extrusion die. For instance, the systems and methods use an imaging system to provide dimensional data that can be used to calculate a tool path. The tool path can be used by a tool to alter a workpiece during manufacture of the extrusion die.

In one aspect, an apparatus for manufacturing a workpiece using optical dimensioning is provided. The apparatus comprises a tool configured to alter at least one feature of the workpiece; an imaging system coupled to the tool, the imaging system defining an optical axis, the imaging system configured to capture a plurality of images of the at least one feature of the workpiece; and a controller comprising one or more processors, the controller configured to analyze the plurality of images to determine measured dimensions of the at least one feature of the workpiece, the controller further configured to define a three-dimensional path for operating the tool by applying a predefined modification to the measured dimensions of the at least one feature of the workpiece.

In some embodiments, the tool is included in a computer numerically controlled machine, and the one or more processors are configured to create a program defining the three-dimensional path of the tool, the program configured to be loaded into a memory in a controller of the computer numerically controlled machine.

In some embodiments, the imaging system comprises a camera and a lens that is optically coupled to the camera, wherein the lens is a telecentric lens. In some embodiments, the imaging system further comprises: a first light source defining an illumination axis that is configured to be substantially coaxial with an optical axis of the lens; and a second light source defining an illumination axis, wherein an angle between the illumination axis of the second light source and the optical axis of the lens is less than 90°.

In some embodiments, the imaging system has a measurement repeatability of 1 μm or less. In some embodiments, the apparatus further comprises a light source configured to illuminate at least a portion of the workpiece. In some embodiments, the light source comprises a ring light.

In some embodiments, the tool is at least one of a cutting bit, a tool-electrode, a water jet nozzle, a laser source, or an additive tool. In some embodiments, the imaging system is fixed relative to the tool. In some embodiments, the imaging system is disposed in an enclosure that is configured to inhibit debris from contacting the imaging system.

In some embodiments, the workpiece is an extrusion die for a honeycomb body and comprises a plurality of pins, and wherein the at least one feature of the workpiece is a slot between adjacent pins. In some embodiments, the slot is less than 0.25 mm.

In one aspect, a method of manufacturing a workpiece using optical dimensioning is provided. The method comprises inspecting a workpiece using an imaging system by collecting images of the workpiece; analyzing image data that is derived from the images to form dimensional data based at least in part on measured dimensions of at least one feature included in the workpiece; calculating a tool path by applying a predefined modification to the measured dimensions; and altering the workpiece to change at least one dimensional attribute of the at least one feature using at least one tool, the tool traveling along the calculated tool path.

In some embodiments, the method further comprises inspecting the workpiece to determine an orientation of a surface of the workpiece facing the tool and a distance between the surface of the workpiece and the tool in an axis substantially parallel to a tool reference axis, wherein the tool is mounted in a tool holder and the tool reference axis is defined by the tool holder.

In some embodiments, the method further comprises inspecting the workpiece using the focus of the imaging system to determine a distance between a surface of the workpiece facing the tool and the tool along an axis substantially parallel to a tool reference axis, wherein the tool is mounted in a tool holder and the tool reference axis is defined by the tool holder.

In some embodiments, the tool is at least one of a cutting bit, a tool-electrode, a water jet nozzle, a laser source, or an additive tool.

In some embodiments, the method further comprises calibrating the imaging system to correlate a size of at least one pixel of the image data to a unit of physical dimension.

In some embodiments, the method further comprises calibrating the imaging system to measure an offset dimension between an optical axis of the imaging system to a tool reference axis, wherein the tool is mounted in a tool holder and the tool reference axis is defined by the tool holder, and wherein the optical axis of the imaging system and the machine tool reference axis are substantially parallel.

In some embodiments, the workpiece is an extrusion die for a honeycomb body and comprises a plurality of pins, and wherein the at least one feature of the workpiece is a slot between adjacent pins.

In some embodiments, inspecting the workpiece comprises: collecting image data of a first pin of the plurality of pins included in the workpiece; analyzing the image data of the first pin to determine one or more measured dimensions of the first pin; collecting image data of a second pin of the plurality of pins included in the workpiece; and analyzing the image data of the second pin to determine one or more measured dimensions of the second pin.

In some embodiments, machining the workpiece comprises using a computer numerically controlled machine, and wherein calculating the three-dimensional tool path comprises creating a G-code program that defines the three-dimensional machine tool path to load into a memory in a controller of the computer numerically controlled machine.

In some embodiments, the imaging system has a measurement repeatability of 1 µm or less.

In another aspect, a computer program product comprising a computer-readable storage medium having instructions recorded thereon for enabling a processor-based system to perform operations is provided. The operations comprise causing an imaging system to inspect a workpiece by collecting images of the workpiece; analyzing image data that is derived from the images to form dimensional data based at least in part on measured dimensions of at least one feature included in the workpiece; calculating a three-dimensional tool path using the dimensional data and a plurality of predefined modification, wherein calculating the three-dimensional tool path comprises creating a program that defines the three-dimensional tool path to load into a memory in a controller of a computer numerically controlled machine; and cause at least one tool included in the computer numerically controlled machine to alter the at least one feature included in the workpiece by traveling along the calculated three-dimensional tool path and altering at least one dimensional attribute of the at least one feature.

In some embodiments, the program that defines the three-dimensional tool path is a G-code program. In some embodiments, the imaging system has a measurement repeatability of 1 µm or less.

In another aspect, a method of modifying an extrusion die using optical dimensioning is provided. The method comprises inspecting the extrusion die, analyzing image data, and altering the extrusion die. The extrusion die is inspected using an imaging system by collecting images of the extrusion die. Image data that is derived from the images is analyzed to form dimensional data based at least in part on measured dimensions of at least one pin of a plurality of pins included in the extrusion die. The extrusion die is altered to change at least one dimensional attribute of the at least one pin using at least one tool.

In some embodiments, the method further comprises calculating a tool path by applying a predefined modification to the measured dimensions, and the at least one tool travels along the calculated tool path.

In some embodiments, inspecting the extrusion die comprises: conducting rough measurements; positioning a camera of the imaging system over the at least one pin; measuring the at least one pin; and recording the measurements of the at least one pin.

In some embodiments, conducting rough measurements comprises determining a flatness of a discharge surface of the extrusion die.

In some embodiments, determining the flatness of the discharge surface of the extrusion die comprises calculating a virtual plane based at least in part on coordinate measurements of a plurality of probed locations on the extrusion die.

In some embodiments, a distance between the imaging system and the extrusion die is calculated based at least in part on the virtual plane. In some embodiments, a distance between the at least one tool and the extrusion die is calculated based at least in part on the virtual plane.

In some embodiments, measuring the at least one pin comprises identifying a center pin at the center of a field of view of the camera based at least in part on image data of the center pin. In some embodiments, the method further comprises mapping X and Y coordinates of corners of the center pin using the imaging system.

In some embodiments, inspecting the extrusion die comprises: collecting image data of a first pin of the plurality of pins included in the workpiece; analyzing the image data of the first pin to determine one or more measured dimensions of the first pin; collecting image data of a second pin of the plurality of pins included in the workpiece; and analyzing the image data of the second pin to determine one or more measured dimensions of the second pin.

In some embodiments, altering the extrusion die comprises using a computer numerically controlled machine.

In another aspect, a method of modifying a pin of an extrusion die using optical dimensioning is provided. The method comprises inspecting the pin, analyzing image data, and altering the pin. The pin of the extrusion die is inspected using an imaging system by collecting at least one image of the pin and calculating a perimeter shape of the pin. Image data that is derived from the at least one image is analyzed to form dimensional data based at least in part on measured dimensions of the pin. The pin is altered to change at least one dimensional attribute of the pin using at least one tool.

In some embodiments, the method further comprises calculating a tool path by applying a predefined modification to the measured dimensions, wherein the at least one tool travels along the calculated tool path.

In some embodiments, altering the pin comprises changing the at least one dimensional attribute of the pin to change the pin from a first configuration to a second configuration, and the perimeter shape of the pin is different in the first configuration than in the second configuration. In some embodiments, the pin comprises a substantially constant width in the second configuration. In some embodiments, the pin comprises a stepped configuration in the second configuration.

In another aspect, a method of modifying an extrusion die using optical dimensioning is provided. The method comprises providing an extrusion die, inspecting the extrusion die, analyzing image data, and altering the extrusion die using at least one tool. The extrusion die comprises a plurality of pins and a first skin forming mask defining a first opening and is configured to extrude a honeycomb extrudate having a first configuration. The extrusion die is inspected using an imaging system by collecting images of the extrusion die. Image data that is derived from the images is analyzed to form dimensional data comprising measured dimensions that are related to at least one deformation attribute of the extrusion die.

In some embodiments, altering the extrusion die comprises changing the at least one deformation attribute of the extrusion die using the at least one tool.

In some embodiments, the method further comprises replacing the first skin forming mask with a second skin forming mask defining a second opening that is smaller than the first opening.

In some embodiments, altering the extrusion die comprises cutting at least one pin of the extrusion die. In some embodiments, cutting at least one pin of the extrusion die comprises altering a perimeter shape of the at least one pin. In some embodiments, cutting at least one pin of the extrusion die comprises cutting a step into the at least one pin.

This Summary is provided to introduce a selection of concepts in a simplified form that are further described below in the Detailed Description. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
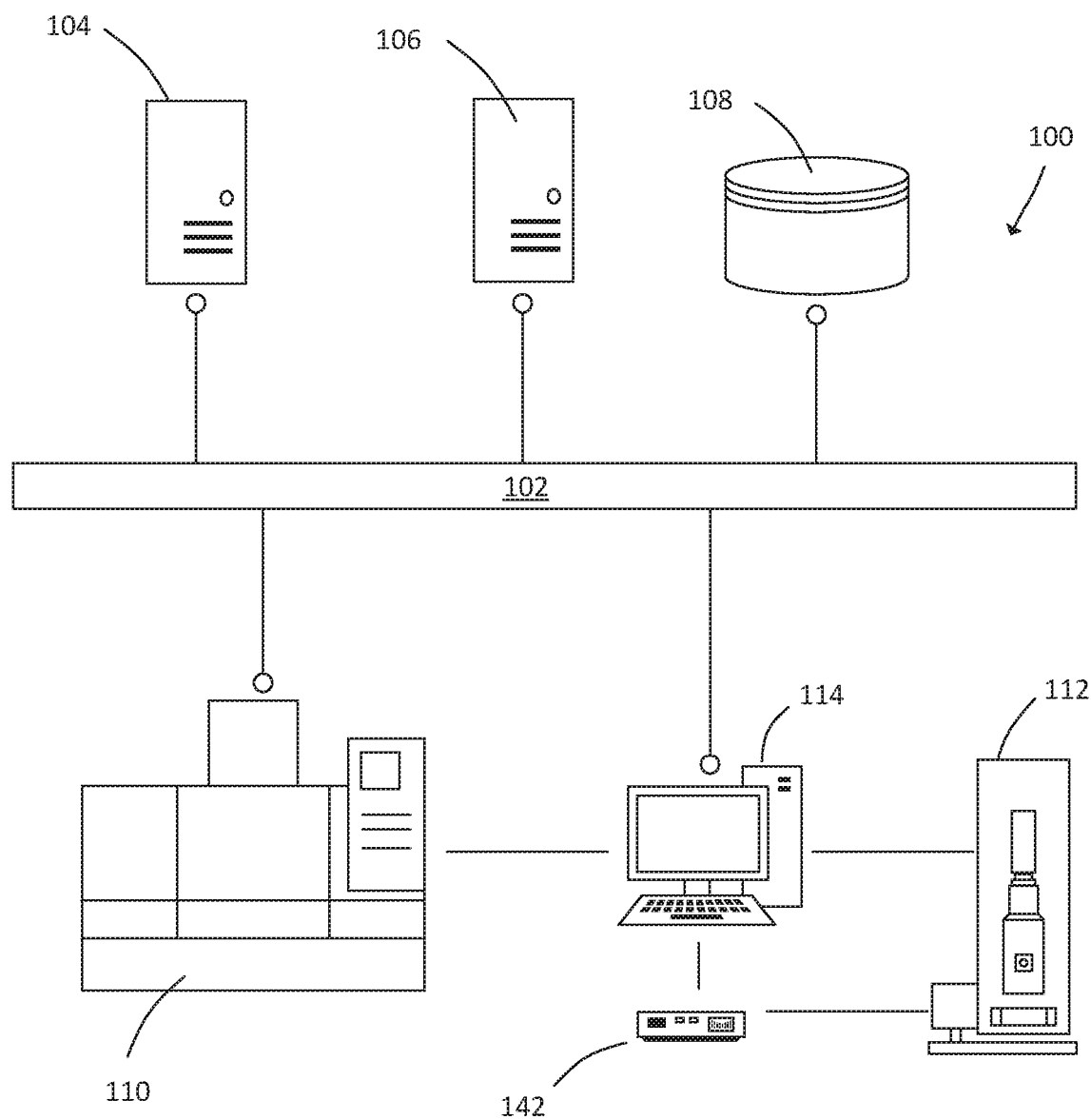
FIG. 1 is a schematic of a system for manufacturing a workpiece according to an embodiment disclosed herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate examples and embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "some embodiments," or the like, indicate that the embodiment(s) described may include a particular feature, structure, or characteristic, but it is not necessary for all other disclosed embodiments to include the particular feature, structure, or characteristic. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Disclosed Embodiments

The embodiments disclosed herein generally provide improved manufacturing of a honeycomb extrusion die from a workpiece using optical dimensioning. Optical dimensioning provides measurement of features of a workpiece in less time than conventional methods and/or enables smaller features to be measured and accurately formed in the workpiece. As disclosed herein, the optical dimensioning can be used in combination with predefined modification dimensions to create a tool path, such as a three-dimensional tool path. The tool path can be used by a tool to alter the workpiece. In some embodiments, the tool path is written into a program that is loaded into memory of a computer numerical control (CNC) machine.

The optical dimensioning enables measurement of features that are in close proximity to another, such as features on the micron scale. In some embodiments, the optical dimensioning is performed by an imaging system that has a measurement repeatability of 1 μm or less (i.e., repeated measurements of the same feature under the same conditions will differ by less than 1 μm). The imaging system can avoid the physical limitations of touch probes and provide non-contact measuring, which increases accuracy and reduces the risk of a touch probe altering the position or features of a workpiece.

In some embodiments, an extrusion die for a honeycomb body is modified using the disclosed embodiments. As an example, slots between pins of the extrusion die can be modified to modify the geometry of the walls of an extruded honeycomb body. Extrusion dies may have thousands of pins arranged at a discharge face of the die. Touch probe measurements would require mapping multiple locations on a pin, and cannot be used for many die designs due to the size of the touch probes physically preventing the touch probes being located within the slots. In an example, an extrusion having 1,420 pins would require 11,360 data points corresponding to the mapped locations. Even if size limitations were not a concern, acquiring data for that many mapped locations traditionally would take a significant amount of time, e.g., many hours. In contrast, utilization of the disclosed embodiments is not limited by the size of the features (e.g., can be used on dies having extremely narrow slots, such as 3 mils (0.0762 mm) or less) and measurement methods according to the disclosed embodiments can be completed in a significantly reduced time frame, e.g., on the order of minutes instead of hours.

The creation of such a tool path may result in an amount of data that requires a data storage capacity that is more than is available in the memory of a CNC machine. In some embodiments, the system allows the large amounts of data to be stored separately from the memory of the CNC machine and accessed for creating a three-dimensional tool path. The tool path can be automatically created using the measurement data and a plurality of predefined modification dimensions.

The embodiments disclosed herein enable modification of existing dies that would otherwise be discarded, thereby providing a cost savings.

FIG. 1 illustrates a system 100 that can be used to manufacture a workpiece using optical dimensioning is configured to provide closed loop feedback to a tool, such as a CNC machine. That closed loop feedback is used to define a three-dimensional tool path based on the actual part feature dimensions measured by the system 100. For example, due to machining tolerances and other imperfections or deviations introduced during manufacture, the features of the die may be created such that the actual dimensions deviate from intended dimensions. As a result, the feature dimensions and locations are based on an actual workpiece, instead of relying on intended dimension, such as provided by a schematic drawing or three-dimensional model (e.g., computer-aided design (CAD) model) of the workpiece. Advantageously, the methods and systems disclosed herein enable the actual dimensions to be utilized by accurately measuring the dimensions of each relevant feature, such the dimensions of every pin at the face of a die. In this way, the system 100 define the tool path by applying a predefined modification, such as defined by a group of variables and/or modification dimensions, to the measured feature dimensions. The measurement information can be stored, and the tool path can be calculated, separately from the CNC machine memory, and the tool path can then be provided to the CNC machine.

In the illustrated embodiment, the system 100 comprises a communication interface 102, a data retention module 104, a database lookup module 106, a data management infrastructure 108, a tool 110, an imaging system 112, a controller 114, and a lighting controller 142.

The communication interface 102 provides communication between the other components of the system 100. The communication interface 102 can enable any data communication network or be at any layer of communication topology. In some embodiments, the communication interface 102 is a communication bus in a single computing device, or a network card or communication module that enables a wide area network (e.g., the Internet), a local area network (LAN), or another type of network, or a combination thereof. In some embodiments, the communication interface 102 enables a local area ethernet network. In this way, the data retention module 104, the data lookup module 106, the data management infrastructure 108, and/or other computerized components of the system 100 can be implemented in a single computing device (e.g., all can be integrated in the controller 114 as a single computer), or in multiple computing device (e.g., the controller 114 as a local computer and the data retention module 104, the data lookup module 106, and the data management infrastructure 108 as one or more remote servers).

The system 100 comprises one or more computing systems. An example of a controller is a system that comprises at least one processor that is capable of manipulating data in accordance with a set of instructions. For instance, a controller can be a computer. The controller can be configured to provide data storage during operation of the system 100. The controller can be configured to house at least one database that can be used to lookup predefined information. For example, the data retention server 104 is configured to store data that is collected during the use of system 100, such as dimensional data relating to features of a workpiece and/or a program written in a numerical programming language (e.g., a "G-code" program). The database lookup server 106 is configured to store data that is used during the creation of the three-dimensional tool path, such as predefined modification dimensions and/or any other manufacturing specifications relating to the workpiece. The data retention server 104 can be separate from the database lookup server 106, as shown in FIG. 1, or the data retention server 104 and the database lookup server 106 can be the same. The system 100 provides the ability to save data to an external data location to use for process monitoring and/or control.

The data management infrastructure 108 is configured to manage data collected during operation of the system 100, such as a suite of software products used for processing data, such as collecting and analyzing data. In an example, the data management infrastructure 108 comprises one or more components of the software suite marketed under the name PI System by OSIsoft, LLC of San Leandro, California, USA.

The lighting controller 142 is configured to control at least one light source of the imaging system 112. The lighting controller 142 can be configured to provide adjustable controls so that attributes of the at least one light source (e.g., brightness levels) can be adjusted. The lighting controller 142 can be a separate device, or integrated with the controller 114 or other computing device.

The tool 110 is configured to alter at least one feature of the workpiece (e.g., using subtractive and/or additive techniques). For instance, the tool 110 can be a CNC machine comprising a machine controller and memory.

Figure 2:
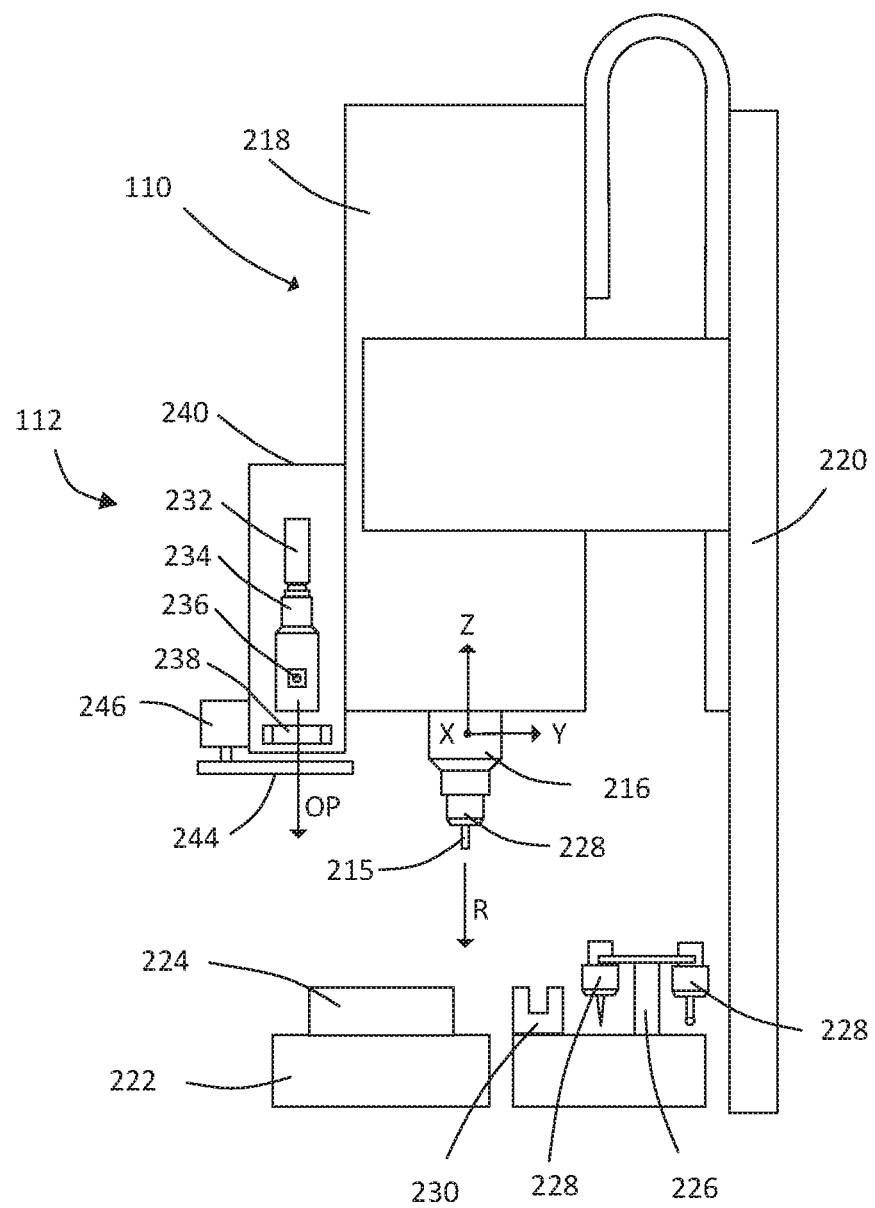
FIG. 2 is a side view of a CNC machine configured according to an embodiment disclosed herein.

In the embodiment shown in FIG. 2, the tool 110 is a CNC mill that comprises at least one cutting bit 215. The tool 110 comprises a tool holder 216 that is coupled to a head 218. The tool holder 216 also defines a tool reference axis R. The head 218 is coupled to a frame 220. The tool 110 also comprises a table 222 where a workpiece 224 can be secured. The tool 110 is configured so that the workpiece 224 and the tool holder 216 are movable relative to each other in X, Y, and Z axes.

The tool 110 can be configured to provide a plurality of different operations. In some embodiments, the tool 110 is a CNC mill that comprises an automatic tool changer 226. The automatic tool changer can be loaded with a variety of devices 228, such as cutting bits and measurement probes, by an operator. During operation, the tool 110 can be directed, e.g., via the controller 114 or other computing device, to switch devices 228 to perform different operations.

One or more tool length setters 230 can be comprised by tool 110. The tool length setter(s) 230 provide information about the actual location of features of device 228 such as a cutter length relative to the tool holder 216, which can be used to provide location of the device 228 relative to the workpiece 224. Additionally, the tool length setters 230 can be used to measure the size, e.g., a diameter, of a cutting device 228. In some embodiments, the tool 110 comprises a plurality of tool length setters 230 with different orientations. The tool length setter(s) 230 can comprise one or more non-contact tool setters (such as a laser tool setter) and/or one or more contact tool setters.

In some embodiments, the tool 110 is a CNC electro-discharge machine that comprises a tool-electrode. In some embodiments, the tool 110 is a CNC water jet. In another embodiment, the tool 110 is a CNC laser mill. In another example, the tool 110 can comprise a pneumatic cutting tool that is sized in a range between 0.004-0.010" and that can rotate at speeds of 125,000-175,000 rpm. In some embodiments, the pneumatic cutting tool comprises a cutting bit having a diameter of approximately 0.15 mm and a rotation speed of approximately 150,000 rpm. The CNC machine can comprise air lines that couple to a pneumatic spindle through the tool holder 216 and that provide pressurized gas (e.g., air at 30 psi) that causes the pneumatic spindle to rotate. In another embodiment, the tool 110 is an additive tool, such as a 3D printer utilizing laser sintering technology. In some embodiments, the tool 110 is configured to add material (e.g., a polymer or metal material) layer-by-layer.

The imaging system 112 is configured to provide accurate image-based dimensional measurements of features of the workpiece 224. The imaging system 112 can be coupled to the tool 110 either directly, such as by being physically attached to a portion of the tool 110 (as shown in FIG. 2), or indirectly so that the position of the imaging system is correlated to the position of the tool 110. The image-based dimensional measurements are gathered and analyzed by the system 100 and used to create a three-dimensional tool path. In an embodiment, a repeatability of 1 µm or less in the feature location and dimensional data provided by imaging system 112, allows machining micron-scale features in workpiece 224. In some embodiments, the imaging system 112 provides a capability to detect features with an accuracy within 1 µm.

In the embodiment of FIG. 2, the imaging system 112 comprises a camera 232, a lens 234, a first light source 236, a second light source 238, and an enclosure 240. The camera 232 is used to capture images of portions of the workpiece 224. In some embodiments, the camera 232 is configured to provide a pixel size that is matched with magnification of lens 234 to provide image repeatability of 1 µm or less. In some embodiments, the camera is a grayscale camera with resolution of at least 2000×2000 pixels. In an embodiment, the camera has a maximum frame rate of about 10 frames per second and comprises an Ethernet interface. In some embodiments, the camera is an Allied Vision Manta G-1236B ASG POE camera having a resolution of about 4112×3008 pixels and a 3.45 µm×3.45 µm pixel size.

The lens 234 is optically coupled to the camera 232 and defines an optical axis. The lens 234 is selected to provide a magnification that, in combination with the camera 232, provides repeatability of 1 µm or less. In some embodiments, the lens is a telecentric lens. In another embodiment, the lens defines a field of view and has parallax distortion of less than 1.0% in at least a portion of the field of view. In some embodiments, a width of the field of view of the imaging system 112 is about 3.5 mm. In another embodiment, the telecentric lens is a Moritex MML3-HR65DVI-5M 3× telecentric lens with a coaxial light port.

The imaging system 112 can comprise at least one light source. The light source can be mounted at any location, such as within the enclosure of the imaging system 112 or outside of the enclosure, such as on the head 218 of tool 110 or on a structure outside of tool 110. In the illustrated embodiment, the imaging system 112 comprises the first light source 236 and the second light source 238 that are both mounted in the enclosure 240 of the imaging system 112.

The first light source 236 is a coaxial light. The first light source 236 is mounted to the lens 234 in a coaxial light port that also comprises a beam director. The beam director redirects light produced by the first light source 236 so that the light is directed approximately parallel to the optical axis OP of the lens 234 and projected out of the lens 234. In some embodiments, the coaxial light is a CCS Inc. HVL2-14RD-HU-M12 compact spotlight that emits light having a wavelength of approximately 645 nm.

In the illustrated embodiment, the second light source 238 is a low angle ring light with a diffusion ring. The second light source 238 can be mounted so that it is movable in the direction of the optical axis OP of the lens 234 and relative to the lens 234. In some embodiments, the second light source 238 is mounted on an adjustable bracket that allows for approximately 10 mm of adjustment along a Z-axis, parallel to the optical axis OP of the lens 234. An advantage of using a low angle ring light for second light source 238 is that it can improve edge detection when a feature of the workpiece 224 has edges that are rounded. In some embodiments, the second light source 238 is a ring light that comprises LEDs that are angled in a range between 45°-75° relative to the optical axis OP of the lens 234, and in an embodiment at an angle of approximately 60° relative to the optical axis OP of the lens 234. In some embodiments, the ring light is a CCS Inc. LDR2-74RD-LA-TR low angle ring light that emits light having a wavelength of approximately 630 nm with a DF-LDR-74LA diffusion ring.

In some embodiments, the two light sources are connected to and controlled by the lighting controller 142 shown in FIG. 1. In an example, the lighting controller 142 is a Gardasoft TR-RT220-2 Trinity LED lighting controller that has 2 channels. The settings, such as brightness levels, of the light sources can be adjustable to assure that the true edges of the features are visible and not obscured by shadow. The light emitted from the light sources is not limited to light in the visible spectrum.

The enclosure 240 is configured to protect the other components of the imaging system 112 from contaminates and debris during the manufacturing of the workpiece 224 so that the debris is inhibited from contacting the components. In some embodiments, the camera 232, lens 234, first light source 236, and second light source 238 are completely contained inside the enclosure 240. The enclosure 240 can comprise one or more access panels and gaskets that seal the access panels to the imaging system components from debris.

The optical axis OP of lens 234 generally extends through a protective transparent window, e.g., a glass or transparent plastic window, of enclosure 240 having an anti-reflective coating. In some embodiments, the window is coated with an anti-reflective coating to minimize the amount of light produced by the light sources that is reflected off of the glass window and back to the camera 232. The enclosure 240 can also comprise a shutter door 244 that is movable between a first orientation and a second orientation. In the first orientation, the shutter door 244 is closed so that it is configured to cover the window, such as during non-inspection operations. In the first orientation, shutter door 244 protects the window from debris such as cutting fluid or material chips and keeps the window clean. In the second orientation, the shutter door 244 is opened so that it is moved away from the window, which allows the camera 232 to capture images of the workpiece 224. The shutter door 244 is moved between the first orientation and the second orientation using an actuator 246. In some embodiments, the actuator 246 is a rotary actuator. The actuator 246 can be pneumatically or electronically driven. Commands for opening and closing the shutter door 244 are provided by the controller 114 shown in FIG. 1.

The imaging system 112 can be integrated into existing CNC machines. In some embodiments, the enclosure 240 is configured to mount to existing mounting holes on a CNC machine head 218. In some embodiments, the imaging system 112 is fixed to the CNC machine head 218 in a selected location so that the CNC machine remains capable of utilizing peripheral hardware, such as automatic tool changers and tool setters.

The controller 114 (e.g., a computer having one or more processors, microcontrollers, microprocessors, etc.) is configured to execute application software. The application software enables a user to control the system 100 manually or to have the system 100 control the tool 110 and imaging system 112 automatically. In manual mode, the user has the ability to collect images, use a live view through the camera 232, and to load images back into the application for analysis. The custom application software allows the user to calibrate the camera 232.

In automatic mode, the custom application software initiates the manufacturing process, including optical dimensioning, after receiving a signal indicating that a workpiece 224 has been loaded. During automatic operation of the imaging system 112, the controller 114 sends a command to place the shutter door 244 into the second orientation so that it is opened. The controller 114 then sends a command to the camera 232 to capture an image. The controller 114 analyzes the image for dimensional attributes of the feature being inspected. Upon successful imaging and analysis of the feature, the controller 114 creates a G-code program that stores the dimensional information of the features of the workpiece being imaged. The controller 114 instructs the tool 110 to move so that the imaging system 112 is located to sequentially collect dimensional data for the features of the workpiece 224. As the system 100 images and analyzes the features of the workpiece 224, the processor appends the dimensional data for the features to the G-code program, and the dimensional data is recorded in the data retention server 104. After a final feature has been imaged and analyzed, the controller 114 saves the G-code program to the data retention server 104 and programmatically loads the G-code program into memory of tool 110.

The tool 110 is provided access the dimensional information related to the features for automated cutting of those features. The G-code program forms the main cutting program for the tool 110 that defines the three-dimensional tool path. In some embodiments, the three-dimensional tool path defines a three-dimensional cutting path for the cutting bit 215 of a CNC mill. The process of creating the G-code program from the dimensional data and loading the G-code program into the memory of tool 110 enables more features to be altered than could otherwise be stored in the memory of tool 110.

Figure 3:
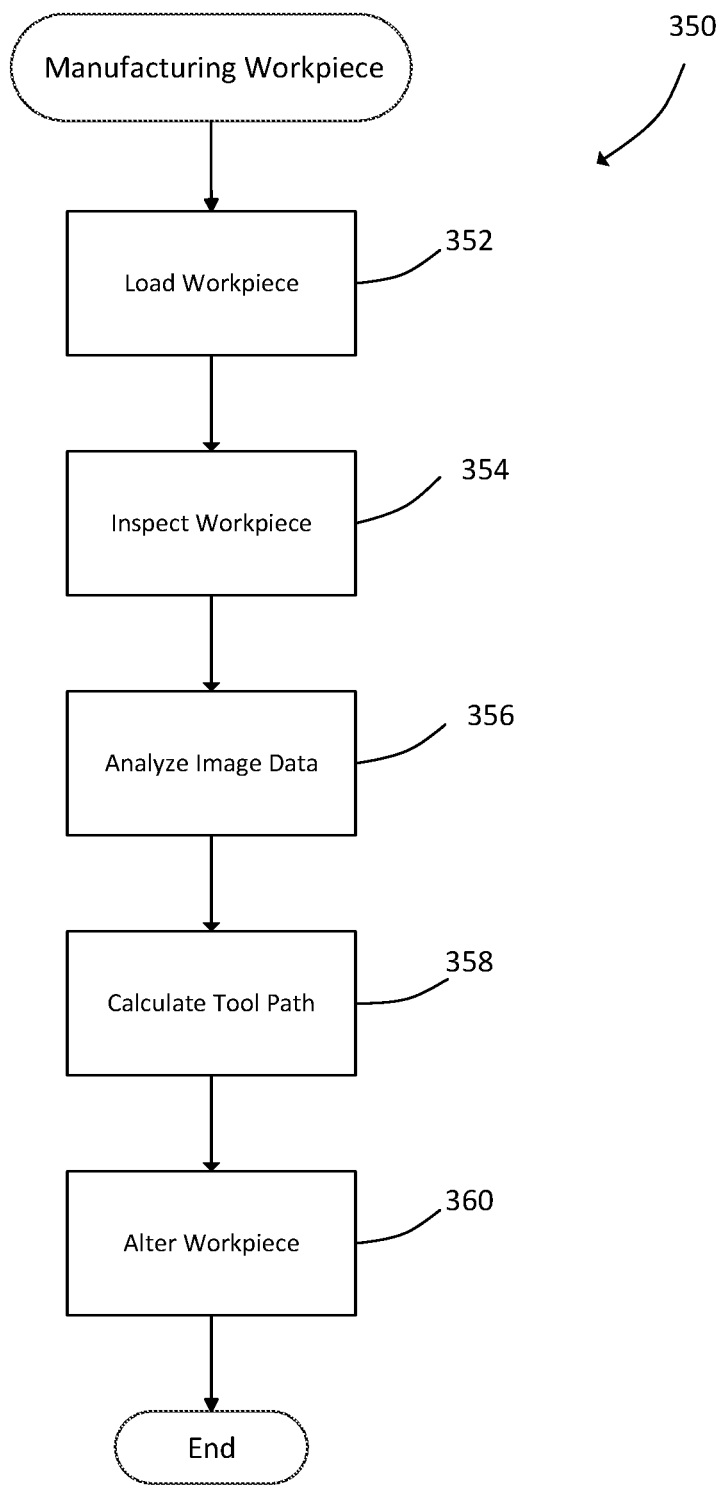
FIG. 3 depicts a flowchart of a method of manufacturing a workpiece using optical dimensioning according to an embodiment.

FIG. 3 depicts a flowchart 350 of a method of manufacturing a workpiece using optical dimensioning. Flowchart 350 can be performed using system 100 shown in FIG. 1, for example. Further structural and operational embodiments will be apparent to persons skilled in the relevant art(s) based on the discussion regarding the flowchart 350.

Figure 4:
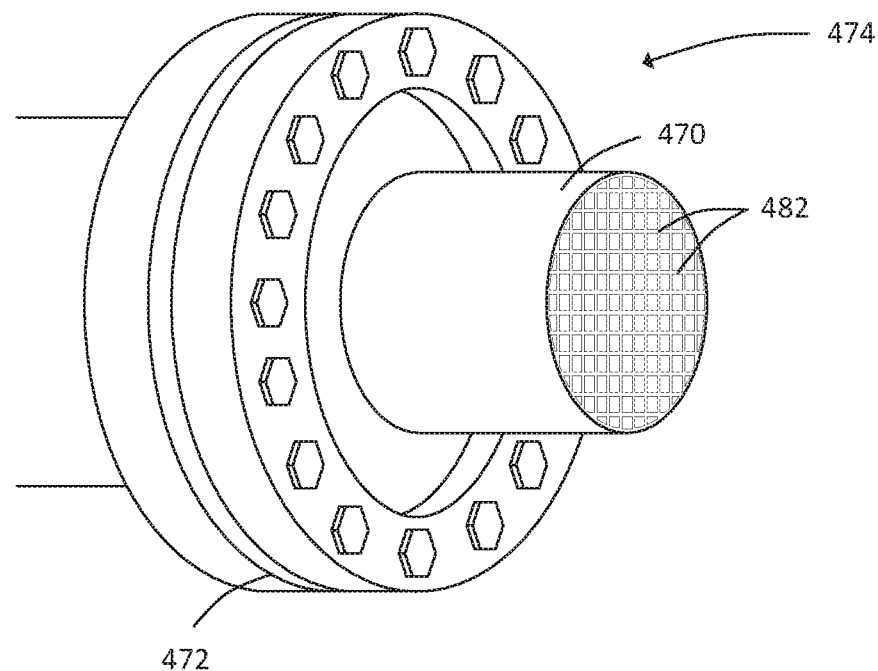
FIG. 4 is a perspective view of an extrusion of a honeycomb body.
Figure 5:
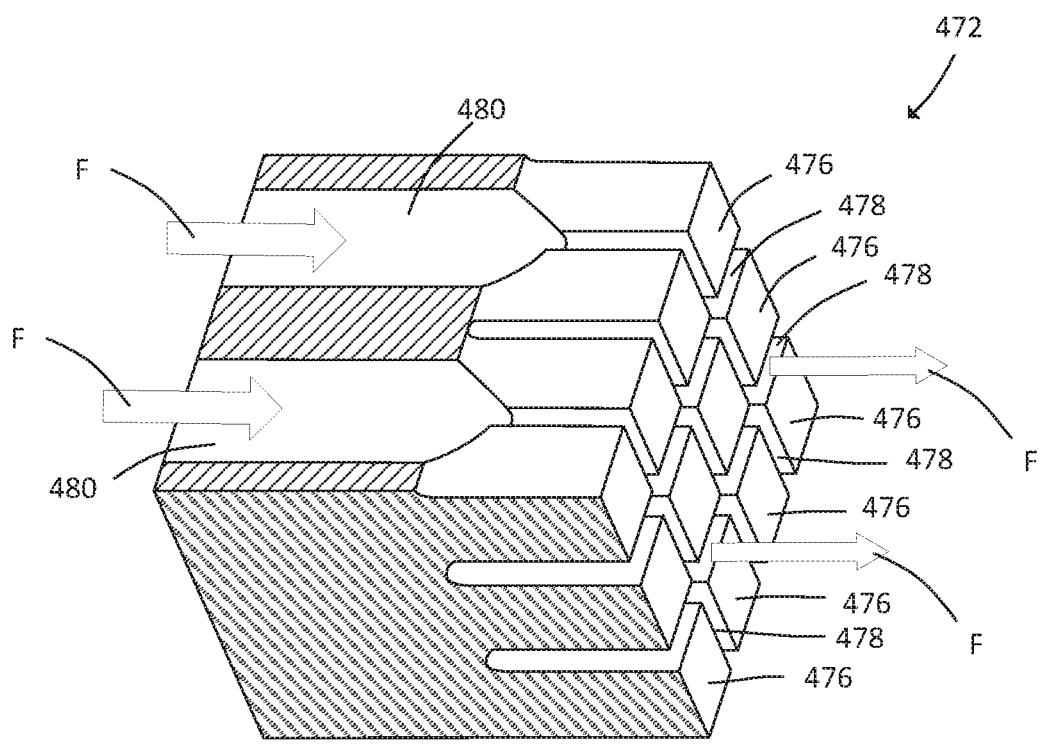
FIG. 5 is a perspective view of a portion of an extrusion die shown in FIG. 4.

In some embodiments, the method of manufacturing a workpiece using optical dimensioning is performed to modify an existing extrusion die for a honeycomb body. As an example, the extrusion die can be used to extrude honeycomb structures used in the construction of particulate filters and catalytic converters. Referring to FIGS. 4 and 5, structure and operation of an extrusion die will be described. A honeycomb body 470 can be constructed by extruding a batch material flow F through an extrusion die 472 in an extruder 474. The extrusion die 472 comprises a plurality of pins 476 that are spaced to define slots 478. The batch material flows into the extrusion die 472 through a plurality of feedholes 480 and is distributed into the slots 478. The size of the slots 478 defines the thickness of inner walls 482 of the honeycomb body 470. As an example, the size of the slots 478 can be less than 0.030" (0.76 mm). In some embodiments, the size of the slots 478 are less than 0.010" (0.25 mm), and in an embodiment the size of the slots 478 are about 0.006" (0.15 mm).

In some instances, it is desired to change the thickness of one or more of the inner walls 482 of a honeycomb body 470, such as inner walls 482 in a perimeter region of the honeycomb body 470. As an example, slots 478 between pins 476 can be widened to produce a honeycomb body 470 having thicker inner walls 482. In some embodiments, slots 478 between pins 476 disposed in a perimeter region of the extrusion die 472 are widened by cutting the pins 476 in accordance with the embodiments. The pins 476 can have any cross-sectional shape, such square (as shown), circular, oval, hexagonal, etc.

Returning now to the flowchart shown in FIG. 3, the method of flowchart 350 begins at step 352. In step 352, a workpiece is loaded onto a workpiece support. In some embodiments, loading the workpiece 224 in step 352 comprises securing the workpiece on a work surface, such as table 222 of tool 110.

As part of loading the workpiece 224 of step 352, an operator can scan a barcode provided on a work order associated with the workpiece 224 or can manually enter an identification number associated with the workpiece 224. The work order can be a paper that stays with the workpiece 224 and provides manufacturing specifications for the workpiece 224, such as which features on the workpiece 224 will be modified. The manufacturing specifications can also be loaded into the database lookup server 106 and used to formulate the G-code program. Scanning the barcode on the work order can be used to look up information in the database lookup server 106. The variables provided in the manufacturing specifications can comprise the diameter of the workpiece 224, slot spacing, slot width, number of pins to be modified, predicted shrink, face gap, plunge depth, pin taper, pin corner radius, etc.

Loading the workpiece 224 at step 352 can also comprise steps such as preparing the tooling, ensuring that the workpiece 224 and the imaging system window are clean, etc. Loading the workpiece 224 can also comprise steps required to prepare the tool 110 such as preparing the devices 228 in the automatic tool changer 226.

At step 354, the workpiece 224 is inspected using the imaging system 112. Inspecting the workpiece 224 at step 354 comprises collecting images of the workpiece 224 using the imaging system 112. The images collected during inspection of the workpiece 224 are used to determine dimensions of features of the workpiece 224. The camera 232 is calibrated to provide accurate dimension measurements of features of the workpiece 224.

The calibration of the camera 232 comprises camera image calibration and camera offset calibration. Camera image calibration comprises calibrating the pixel size of the sensor of the camera 232 relative to a unit of physical dimension and calibrating the image for optical distortion. In particular, the camera image calibration provides a conversion between the camera image pixels and physical dimensions. In some embodiments, a calibration target is used. The calibration target can be a square marker placed in the field of view of the camera 232 that consists of a square with a grid of dots inside. The calibration target has a definitions file associated with it. The camera 232 can be located over the grid of dots at a defined distance, and then moved toward the target until the dot edges are in focus as much as possible. The focus of the camera 232 on the grid of dots also allows the system 100 to rectify the image to remove lens distortion based on the definitions file.

The camera offset calibration comprises calibrating the position of the optical axis OP of the camera 232 relative to the tool reference axis R of the tool holder 216. The X and Y offset dimensions between the camera optical axis OP and the tool reference axis R are determined so that the camera measurements can be used to accurately define the three-dimensional tool path. The camera offset calibration is performed after the camera calibration. In some embodiments, a 2 mm gauge pin is used as a measurement target. A touch probe device (e.g., one of the devices 228) can be mounted in the tool 110 and moved to contact the 2 mm gauge pin to physically locate the center of the gauge pin. The touch probe device 228 is returned to the automatic tool changer 226 and is replaced by a dummy tool. The tool 110 then moves to place the camera 232 over the 2 mm gauge pin, so that the 2 mm gauge pin is in the field of view of the camera 232. The imaging system 112 then calculates the position of the 2 mm gauge pin relative to the center of the field of view of the camera 232. The position of the center measured by the touch probe device 228 is compared to the center of the 2 mm gauge pin determined by the imaging system 112 to determine an offset value, and the offset value is stored. The offset value corresponds to the distance in both X-axis and Y-axis from the optical axis OP of the imaging system 112 to the tool reference axis R.

The calibration of the camera can be performed periodically and is not required to be performed for each manufacturing operation. In some embodiments, the calibration is performed after machining a predefined number of manufacturing operations. In some embodiments, the calibration is performed annually. In another example embodiment, the calibration is performed after an anomaly, such as in response to the imaging system 112 being bumped or moved.

Inspecting the workpiece at step 354 can comprise determining a coarse location of the workpiece 224. In some embodiments, the coarse location of the workpiece 224 is determined using a physical measurement probe, such as a touch probe, to provide a coarse location measurement of workpiece 224. As an example, the touch probe can be used to determine the depth of the workpiece 224 along the Z-axis. The depth of the workpiece 224 can also be determined using the focus of the camera to determine the depth of the workpiece 224 relative to the imaging system 112. After the coarse location of the workpiece is determined, the imaging system 112 is positioned over the top of a first feature of the workpiece 224 to be inspected. As an example, an inspection algorithm is used to identify a pin in the center of the field of view of the camera 232 and that feature is inspected. After the imaging system 112 is positioned, the lighting controller receives an external trigger to illuminate the workpiece 224, and the camera 232 receives an external trigger to collect an image. The imaging system 112 is moved sequentially over the features of the workpiece 224 and is commanded to capture images of the features until all of the features are imaged.

The system 100 can be configured to inspect all features prior to the tool 110 altering the workpiece 224. For example, alternating between inspection and cutting can be complicated because cutting (e.g., in the step of altering the workpiece 224) can result in contamination of the workpiece 224, such as by applying cutting oils or from resultant debris, such as metal chips from cutting. If not addressed, the contaminates may hinder the vision system's ability to be accurate within 1 μm as the camera may detect the contaminates and possibly bias or corrupt the measurement data. In some embodiments, the steps of inspecting and altering are performed sequentially for any given feature before both inspecting and altering the subsequent feature, such as by addition of a cleaning step between each pair of inspecting and altering steps.

At step 356, the images collected by camera 232 are analyzed. Analyzing the image data in step 356 comprises analyzing the collected images to determine the dimensional attributes of the features of the workpiece 224. In some embodiments, the images are analyzed to calculate dimensional data based at least in part on dimensional attributes of at least one feature in the workpiece. In some embodiments, the centroid positions are calculated for the features to be modified. In an embodiment in which the features are square pins, the X and Y coordinates of the corners of the pins can be calculated. Analyzing the image data at step 356 can also comprise analyzing the image for focus and lighting conditions to determine whether the image is of a high enough quality to provide accurate dimensional data.

As the images are analyzed, the system 100 generates a G-code program file comprising the dimensional information. The G-code program is created when the first feature is inspected, populated with the first feature inspection results, and closed. Upon inspection of the next sequential feature, the file is opened, and the inspection results of the next feature are appended to the program. Upon inspection of the last feature, the results of the final feature are appended to the program.

At step 358, a three-dimensional tool path is calculated. Calculating the tool path at step 358 comprises using the dimensional data of the G-code program and a plurality of predefined modification dimensions to complete the G-code program so that the G-code program defines the three-dimensional tool path. The predefined modification dimensions can comprise the modification amount, total modification depth, and pin corner radius, which can be automatically written into the G-code program. After the G-code program is completed, it is programmatically loaded into the memory of tool 110. The method of automatically generating a G-code program allows for the storage and usage of a quantity of data points prior to cutting that previously was not available.

In some embodiments, calculating the tool path at step 358 utilizes a Macro-b programming technique that utilizes macro variables to provide the three-dimensional tool path. In accordance with this embodiment, when the tool 110 reads a line of the program that presents a macro variable, instead of using a hardcoded value, the tool 110 looks to a macro variable register and uses the number contained in the register. Using the Macro-b programming technique allows the tool 110 to alter different workpieces 224 having different feature sizes using a single tool path program. In another embodiment, the technique enables the tool 110 to loop through the same code, such as a code to drive the tool 110 around a pin, to incrementally alter the feature. In some embodiments, at each step of the loop, a Z-axis value is decreased by a constant amount in each step. As a result, the chip load may remain the same regardless of the feature size. In another embodiment, the technique can be used to create a helical interpolation around the feature. The program is able to stop the helical interpolation of the pin when it comes to the final depth of the feature modification.

At step 360, the workpiece 224 is altered. Altering the workpiece at step 360 comprises altering the workpiece 224 to change at least one dimensional attribute of a feature of the workpiece 224. The workpiece 224 is altered by at least one tool 110 with the tool 110 traveling along the calculated three-dimensional tool path. In some embodiments, tool 110 comprises a cutter that removes material as it travels along the three-dimensional tool path.

In some embodiments, after the tool path is loaded into the memory of tool 110, prior to altering the workpiece 224, a tool preparation procedure can be performed. In some embodiments, the tool preparation procedure comprises rotating the tool device 228 prior to altering the workpiece 224, such as by rotating a cutter at different speeds to warm up the tool 110. In another embodiment, the tool preparation procedure comprises measuring the tool device 228 such as by measuring a cutter length and cutter diameter, such as with a tool length setter 230 described above.

The cutting process can also utilize a custom tool life management G-code program. The tool life management program can track the number of times a tool device 228 has been used to alter a feature of a workpiece. The tool life management program uses the tracked number and compares that with a tool break check increment. The tool life management program can also replace the tool device 228 if an expiration variable is reached.

Figure 7:
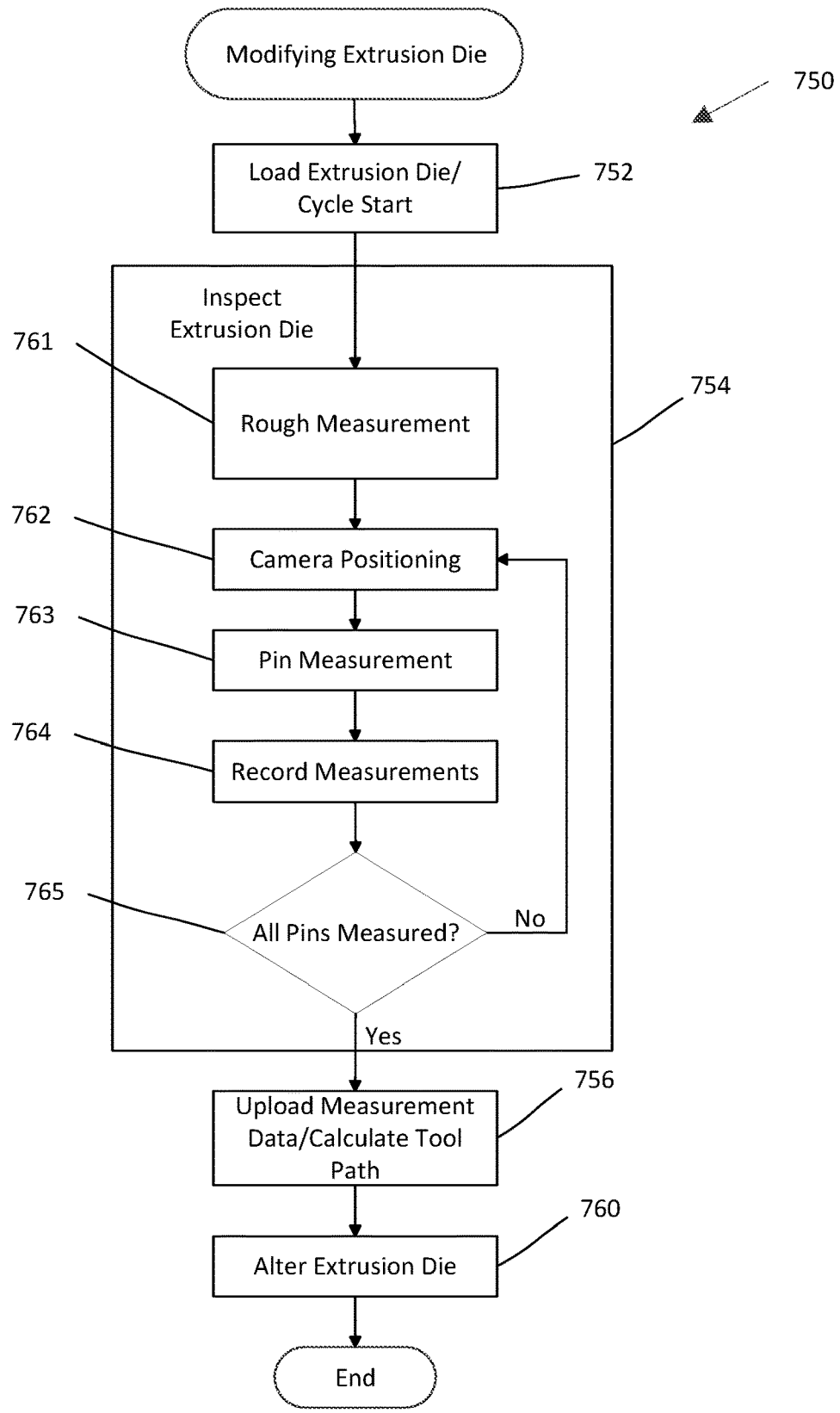
FIG. 7 depicts a flowchart of a method of machining an extrusion die using optical dimensioning according to an embodiment.

FIG. 7 depicts a flowchart 750 of a method of modifying an extrusion die using optical dimensioning. Flowchart 350 can be performed using system 100 shown in FIG. 1, for example. Further structural and operational embodiments will be apparent to persons skilled in the relevant art(s) based on the discussion regarding the flowchart 750.

Figure 8:
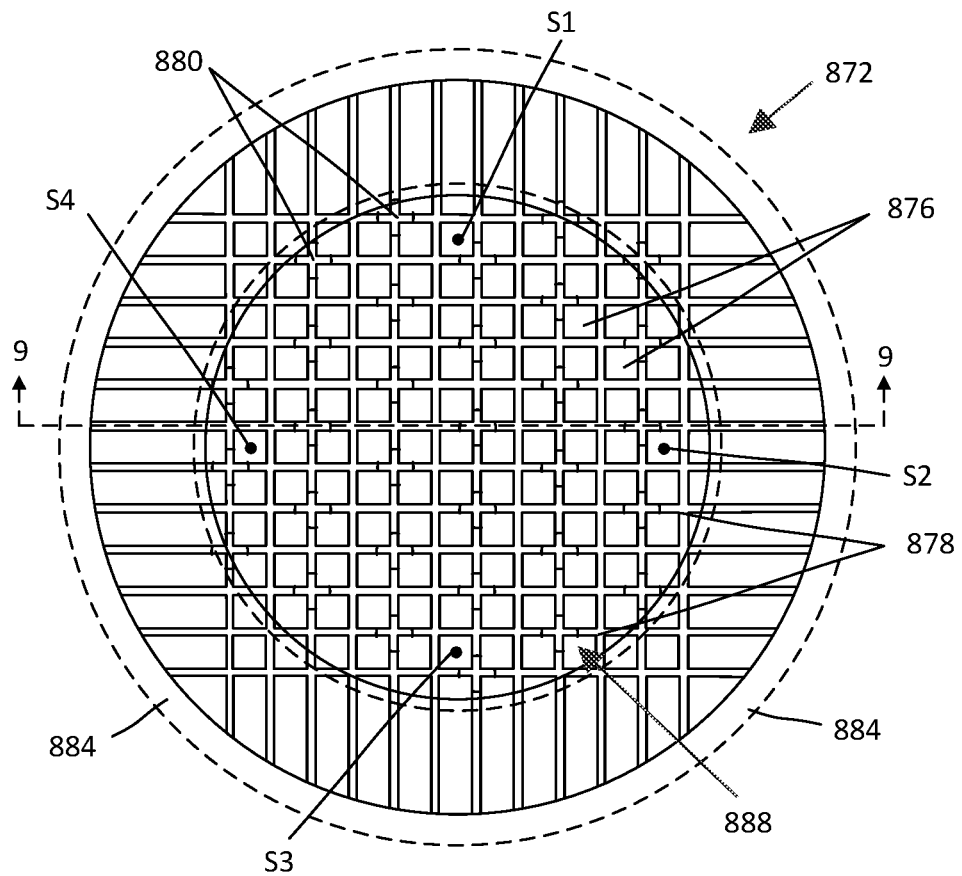
FIG. 8 is an end view of an extrusion die.
Figure 9:
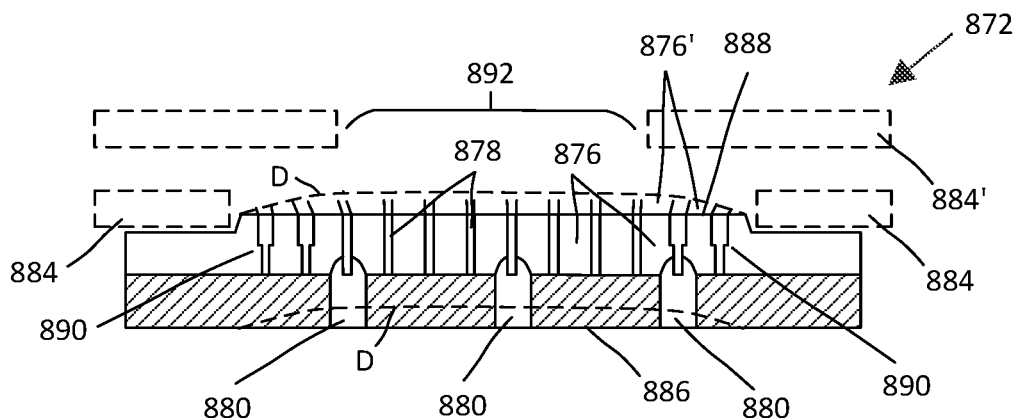
FIG. 9 is a cross-sectional view of the extrusion die of FIG. 8 taken along line 9-9.

In some embodiments, the method of modifying an extrusion die is applied to an extrusion die 872, shown in FIGS. 8 and 9. The extrusion die 872 can be coupled to an extruder and comprises a plurality of pins 876 that are spaced to define slots 878. A ceramic-forming mixture flows into the extrusion die 872 from an inlet surface 886 through a plurality of feedholes 880 and is distributed into slots 878. The ceramic-forming mixture exits the extrusion die 872 from a discharge surface 888 as a honeycomb extrudate, which can be cut to form an extruded honeycomb body. The size of the slots 878 defines the thickness of inner walls of the honeycomb extrudate. Additionally, the extrusion die 872 can comprise a skin forming mask 884 that defines an opening and is used to force a portion of the ceramic-forming mixture to form an outer skin on the honeycomb extrudate.

In some instances, it is desired to change the thickness of one or more of the inner walls of a honeycomb body by altering an existing extrusion die. It may be desired to alter an existing extrusion die to alter the configuration of a honeycomb extrudate so that a die that has otherwise been worn beyond its useful life or become deformed, such as shown by dashed line D of FIG. 9, can be recycled and repurposed to produce a different configuration of honeycomb body.

The method of flowchart 750 begins at step 752. In step 752, an extrusion die, such as extrusion die 872, is provided and loaded onto a workpiece support and the modification cycle is started. Loading the extrusion die 872 in step 752 can comprise securing the extrusion die, such as by mounting the extrusion die 872 to a work surface using tooling fixtures. As an example, the work surface can be the table 222 on a tool 110, such as a CNC machine tool of FIGS. 1 and 2. Loading and starting the modification cycle for the extrusion die 872 can include scanning a barcode provided on a work order or entering an identification number associated with the extrusion die 872. Scanned information and/or the identification number can be used to look up information in a database lookup server 106, such as the number of pins 876 included in the extrusion die 872, spacing of the pins 876, etc.

At step 754, the extrusion die 872 is inspected using an imaging system, such as imaging system 112. Inspecting the extrusion die at step 754 comprises conducting rough measurements at step 761, positioning the camera at step 762, measuring a pin at step 763, recording the measurements at step 764, and determining whether all of a set of desired pins, which can include every pin in the extrusion die 872, have been measured. The steps of positioning the camera, measuring a pin, recording the measurements, and making the determination of whether all of the desired pins have been measured are repeated until it is determined that all of the desired pins of the extrusion die have been measured.

At step 761, rough measurements of the extrusion die 872 are performed. The rough measurements can be used to determine the general attributes of the extrusion die 872 and to determine the position of the extrusion die 872 relative to the imaging system 112 and the tool 110. For example, the flatness of the discharge surface 888 of the extrusion die 872 and the rough position of the extrusion die 872 relative to the tool 110 can be determined. The flatness of the extrusion die can be determined by determining the relative heights of a plurality of positions on a face of the extrusion die, such as three, four or more positions. In an example embodiment, four positions are probed on the extrusion die, such as at four spaced positions S1, S2, S3, and S4 on the extrusion die 872. A virtual plane, or surface, can be calculated in the machine tool coordinate space using the rough measurements. That virtual plane, or surface, can be used to position the imaging system 112 at a proper Z-axis height relative to the extrusion die 872 (i.e., a distance between the imaging system and the extrusion die 872) so that the portion of the extrusion die 872 that is desired to be imaged remains in focus despite variation in thickness of the extrusion die 872 and so that the system can be used with extrusion dies having different thicknesses. That virtual plane, or surface, can also be used to position the tool 110 at a proper Z-axis height relative to the extrusion die 872 (i.e., the distance between the tool 110 and the extrusion die 872), and to generate a tool path of tool 110 so that a Z-axis depth of cut can be calculated.

The rough measurements can be gathered using one or more contact and/or non-contact measuring devices. As an example, a touch probe and/or a laser measurement sensor can be used to take the rough measurements. Still further, the imaging system 112 can be used to make the rough measurements such as by utilizing the focus of an image taken with the camera 232 and the depth of field of the combined camera 232 and lens 234 to determine the distance between the camera 232 and the extrusion die 872. The measuring device can be driven manually by an operator or automatically using a programmed rough measurement process.

At step 762, the camera 232 of imaging system 112 is positioned over the pins 876 of the extrusion die 872. The camera can be located relative to the extrusion die 872 manually by an operator or automatically using a programmed process. As an example, the camera can be located over the pins 876 automatically by positioning the camera between the rough measurement positions S1, S2, S3, and S4.

At step 763, a pin 876 of the extrusion die 872 is measured using the imaging system 112. The camera 232 included in the imaging system 112 can have a field of view that is large enough to encompass a plurality of pins 876 of the extrusion die 872. In an example embodiment, after the camera 232 of imaging system 112 is positioned over the pins 876 at step 762, a shutter door 244 included in the enclosure 240 of the imaging system 112 can be opened so that at least a portion of the extrusion die 872 can be imaged.

Figure 10:
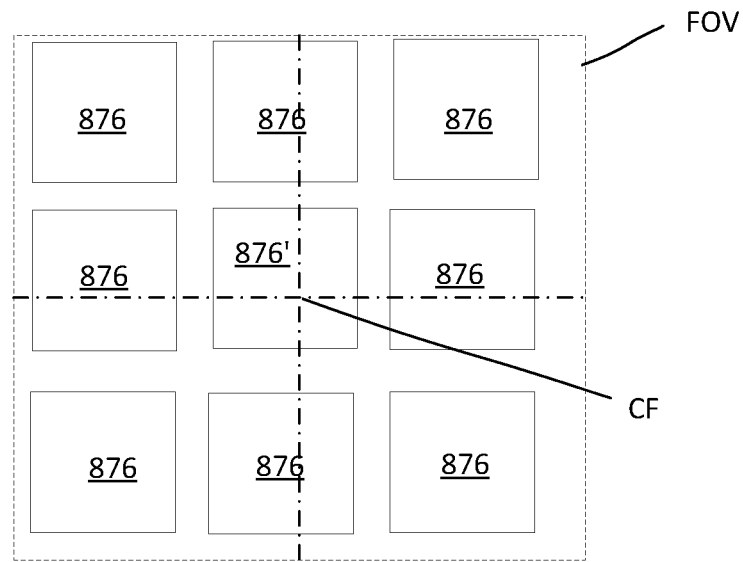
FIG. 10 is an end view of a portion of the extrusion die of FIG. 8.
Figure 11:
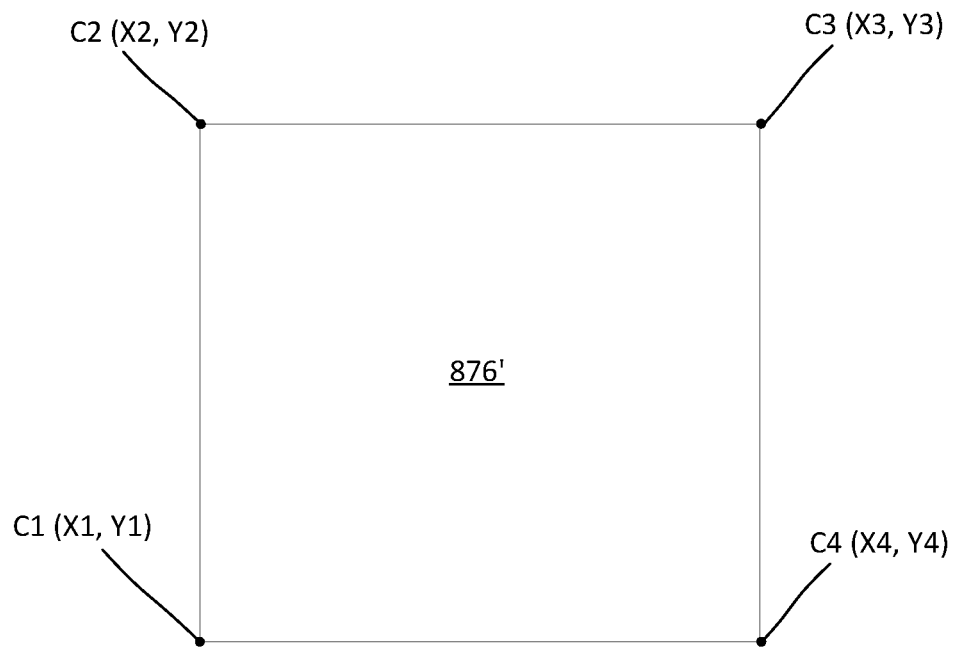
FIG. 11 is an end view of a pin included in the extrusion die of FIG. 8.

In an example shown in FIG. 10, the field of view FOV of the camera of imaging system 112 can be selected to capture a plurality of pins, or portions of a plurality of pins, such as nine (9) pins. The image includes a single center pin 876' that is overlaid by the center point CF of the field of view FOV of the camera. Attributes of the center pin 876' are measured using the imaging system 112 by collecting image data of the center pin 876' and analyzing the image data to form dimensional data based at least in part on one or more measured dimension. The measured dimensions of the pin 876' can include mapping X-Y coordinates of features, such as coordinates of corners of a polygonal pin or coordinates of a center and a diameter of a circular pin, of the pin 876'. In some embodiments, the X-Y coordinates of multiple locations on the pin 876' can be determined, such as corners, a plurality of locations adjacent the corners, or a plurality of locations along edges of the pin 876'. For example, the measurement data can include an X value and a Y value for each corner C1, C2, C3, and C4 of the pin 876'. In some embodiments, a plurality of locations along the perimeter edge of the pin 876' are determined so that an edge shape can be interpolated between the locations.

At step 764, the coordinates of the locations measured in step 763 are recorded. In an example, the dimensional information related to the coordinate measurements are recorded in a G-code program, such as a G-code program created by controller 114 of the imaging system 112. In an example, the G-code program is created after inspection of a first pin 876 and is populated with the dimensional information related to the first pin 876.

At step 765, a query is submitted, such as by submitting a query to the controller 114, to determine if all of the desired pins 876 have been measured. If it is determined that less than all of the desired pins 876 have been measured, the steps of camera positioning 762, pin measurement 763, and recording the measurements 764 are repeated until all or the desired subset of pins 876 have been measured. After measurements for each pin 876 are recorded in the G-code program, the G-code program can be closed. The G-code program can be re-opened and the measurements corresponding to subsequently measured pins 876 recorded by appending the measurements to the G-code program. After the last pin 876 is inspected, the measurements are appended to the G-code program and any additional information required to complete the G-code program, such as information required to properly format the G-code program.

At step 756, the measurement data is uploaded into the tool 110 and a tool path is calculated. The tool 110 utilizes the measurement data to construct a tool path. The tool path is constructed accounting for a predetermined dimension of material removal for each tool pass, desired cutting speed, etc. In some embodiments, the measurement data is presented in the G-code program, but it should be appreciated that the measurement data can be provided in other data files.

Figure 12:
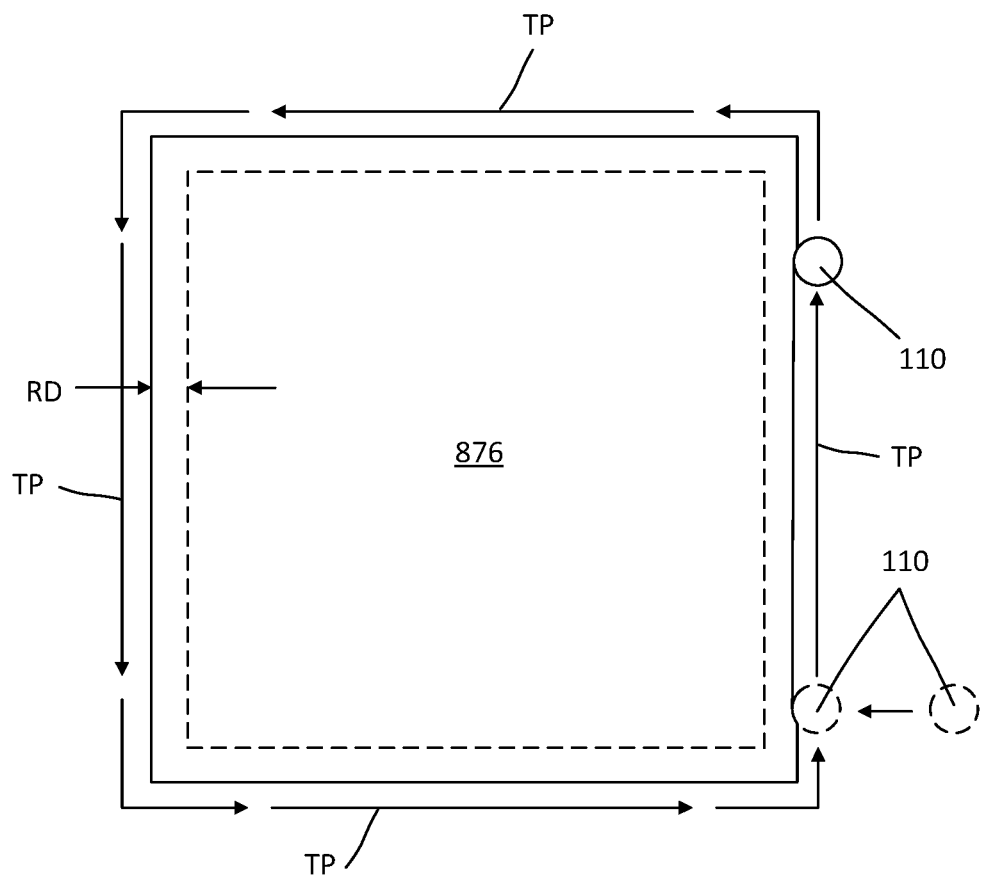
FIG. 12 is a schematic view of a pin of an extrusion die, illustrating a tool path.
Figure 13:
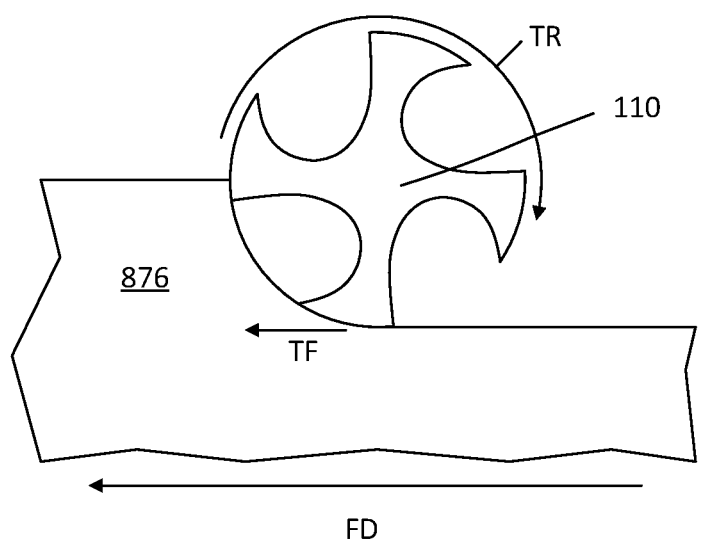
FIG. 13 is a schematic view of a portion of the pin of FIG. 12, illustrating a tool path.

At step 760, the extrusion die 872 is altered using a tool, such as tool 110, as shown schematically in FIGS. 12 and 13. The measurement data can be used in conjunction with additional process parameters, such as tool feedrate, finish allowance, radial depth of cut per pass, and axial depth of cut per pass. The tool feedrate is a speed that the tool 110 travels during alteration of a pin 876. The finish allowance is an amount of material that is left for a final finishing pass of tool 110. The radial depth of cut per pass is an amount the tool 110 is engaging radially into the material of the pin 876 during a cut. The axial depth of cut per pass is the amount the tool 110 is engaging axially into the material of the pin 876 during a cut. In some embodiments, a pin 876 is milled using a CNC mill and the tool feed direction FD is the same as the tool cutting force TF applied to the pin 876 by the tool 110. When viewing a top view of a pin 876 the outer dimensions of the pin 876 can be altered with the tool 110 following a tool path that is counter-clockwise around the outer perimeter of the pin 876 while the tool rotation TR is in a clockwise direction. It should be appreciated that the tool 110 can travel around the pin 876 in a plurality of cutting passes until the desired final radial depth of cut RD and final axial depth of cut AD are achieved. The number of passes can be determined at least in part based on a size of the slots 878 of the extrusion die 872, the size of tool 110 that is able to fit into the slots 878, and an amount of material that the tool 110 can remove in a single pass for a given feedrate.

A tool path TP of tool 110 can utilize a Macro-b programming technique that utilizes macro variables. The technique can be used to loop through a program code to drive the tool 110 around a pin. In each run of the code a variable can be decreased by a constant amount so that the amount of waste material remains the same regardless of the pin size and corner radius. In some embodiments, the technique can be used to generate a helical tool path that continues until the final radial depth of cut RD and the final axial depth of cut AD are achieved.

An advantage of the systems and methods of manufacturing using optical dimensioning is that the performance of an extrusion die can be improved after its initial manufacture and use. An additional advantage is that in some instances worn and deformed extrusion dies can be modified precisely so that they can continue to be used, such as for a second configuration of a honeycomb extrudate. In some instances, it is desired to alter the surface of a roughened pin or to increase the thickness of one or more of the inner walls of a honeycomb body. The corresponding slots in an extrusion die can be widened to accomplish the change in thickness.

Figure 14:
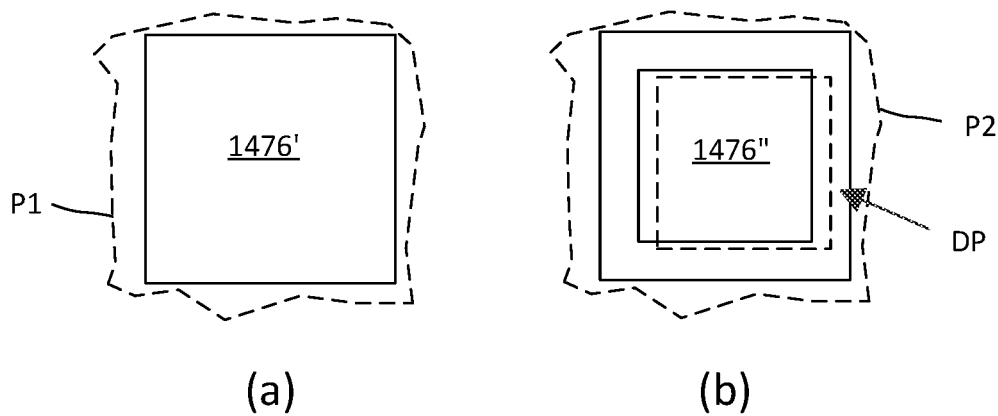
FIG. 14 is an end view of pins of an extrusion die.
Figure 15:
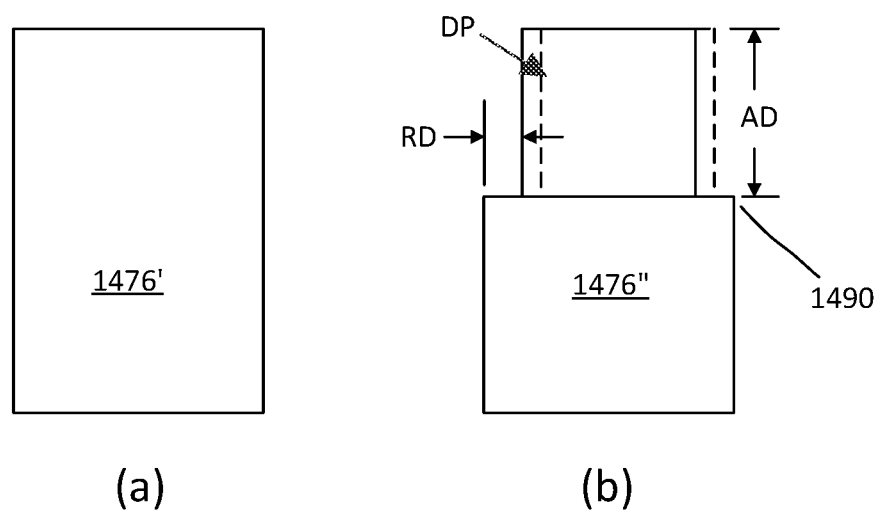
FIG. 15 is a side view of the pins of FIG. 14.

Referring to FIGS. 14 and 15, examples of modified pins 1476', 1476" of an extrusion die are shown. For example, FIGS. 14(*a*) and 15(*a*) illustrate an example of a pin 1476' that is machined from a first configuration, shown by dashed line P1, that can correspond to a roughened configuration of the pin. Optical measurement can be used to alter the roughened configuration into a desired configuration. As an example, an imaging system, such as imaging system 112 can be used to image and calculate measured dimensions of the pin and to calculate and map the perimeter shape of the pin. A tool path can be calculated by applying at least one predefined modification to the measured dimensions. A machine tool can be used to alter the extrusion die by altering the perimeter shape of the pin until the configuration of pin 1476' is achieved. As shown, pin 1476' comprises a substantially constant width over its length.

FIGS. 14(*b*) and 15(*b*) illustrate an example of a pin 1476" that is machined from a first configuration, shown by dashed line P2, that can correspond to a roughened configuration of the pin. Optical measurement can be used to alter the roughened configuration into a desired configuration of the pin. As an example, an imaging system, such as imaging system 112 can be used to image and calculate measured dimensions of the pin and to calculate and map the perimeter shape of the pin. A tool path can be calculated by applying at least one predefined modification to the measured dimensions. A machine tool can be used to alter the extrusion die until the configuration of pin 1476" is achieved. As shown, pin 1476" comprises a stepped configuration including a step 1490 where the width of the pin 1476" changes from a first width to a second width.

The method of using optical measuring is advantageous for machining the pins because the modification is based on actual measurements of the pins which improves accuracy of the machining process. As shown by FIGS. 14(*b*) and 15(*b*), the dimensions of step 1490 can be made substantially consistent around the perimeter of pin 1476" using the imaging system to determine the location and actual dimensions of the pin prior to altering the configuration. Because the actual dimensions and location of the pin are determined using image data, a consistent offset equal to the final radial depth of cut RD can be applied equally around the perimeter of the pin. FIGS. 14(*b*) and 15(*b*) also illustrate an example of a stepped configuration created using assumed, or design, dimensions and location of the pin as shown by dashed lines DP. For example, if modification of an extrusion die is premised on assumed or design dimensions and there is any difference between those assumed or design dimensions and the actual location or dimensions of the extrusion die, then the modification will not correspond to the desired modification. In an example shown by dashed lines DP, the actual location of the pin is offset compared to the design or assumed location and, as a result, a modification including a step is biased in relation to the actual pin. Therefore, consistent modification of the extrusion die is more difficult to achieve.

In another example, an existing extrusion die, e.g., at the end of its usable life and configured to extrude a first configuration of honeycomb extrudate, is altered so that the extrusion die is recycled and repurposed to extrude a second configuration of honeycomb extrudate that is different than the first configuration of honeycomb extrudate. During use of an extrusion die, such as extrusion die 872, the extrusion die can become deformed from the pressure of the ceramic-forming mixture being forced through the extrusion die. In some embodiments, the extrusion die can be deformed so that it forms a bulge as shown by dashed line D of FIG. 9. The bulge of the extrusion die may result in at least some of the pins, such as the pins 876' on the perimeter of the extrusion die 872, exhibiting a tilt relative to the direction of flow of the ceramic-forming mixture.

The extrusion die 872 can be modified so that it is configured to extrude a honeycomb extrudate having a second configuration that is different than the honeycomb extrudate having the first configuration to avoid scrapping the extrusion die. The second configuration can include different overall outer dimension and/or shape, and different inner wall thicknesses compared to the first configuration of a honeycomb extrudate that is extruded through the extrusion die.

The imaging system and method of modifying the extrusion die can be used to determine the configuration of the used extrusion die and to alter the configuration of portions of the die 872 to create the second configuration of honeycomb extrudate. An imaging system, such as imaging system 112, can be used to inspect the extrusion die by collecting images of the extrusion die. Image data derived from the images can be analyzed to form dimensional data comprising measured dimensions relating to at least one deformation attribute of the extrusion die. The extrusion die can then be altered using a tool. For example, portions of the extrusion die 872 can be altered using a tool and/or the skin forming mask 884 defining the first opening can be replaced with a second skin forming mask 884' that defines a second opening 892 that is smaller than the first opening. For example, pins 876 disposed at a perimeter of the opening 892 can be modified, such as by reducing the width or by adding steps, to produce a halo region relating to the smaller opening 892. The smaller opening 892 and the modified pins can be used to produce the second configuration of honeycomb extrudate. The second skin forming mask 884' masks the tilted perimeter pins of the deformed extrusion die 872 and forms an opening 892 that is smaller in size thereby reducing the overall outer dimension of the honeycomb extrudate manufactured using the extrusion die 872.

III. Example of Computing System Implementation

Figure 6:
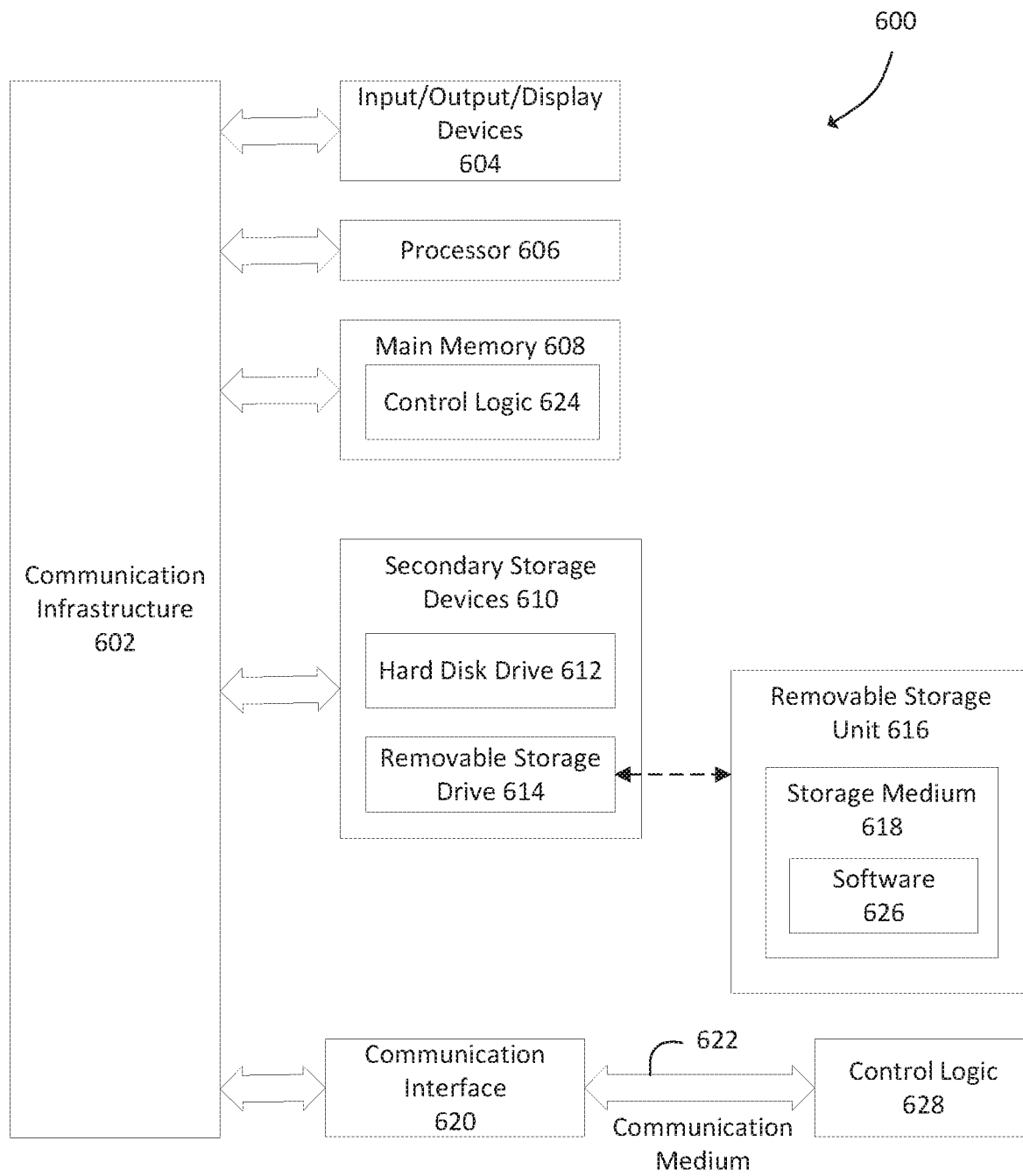
FIG. 6 is a block diagram of a computing system that can be used to implement various embodiments.

Embodiments, systems, components, subcomponents, devices, methods, flowcharts, steps, and/or the like described herein, including but not limited to the system 100, tool 110, and/or imaging system 112 of FIG. 1, and/or flowchart 300 of FIG. 3 can be implemented in hardware (e.g., hardware logic/electrical circuitry), or any combination of hardware with software (computer program code configured to be executed in one or more processors or processing devices) and/or firmware. The embodiments described herein, including systems, methods/processes, and/or apparatuses, can be implemented using well known computing devices, such as computer 600 shown in FIG. 6. For example, data retention server 104, database lookup server 106, controller 114, and each of the steps of flowchart 300 can be implemented using one or more computers 600.

Computer 600 can be any commercially available communication device, processing device, and/or computer capable of performing the functions described herein. Computer 600 can be any type of computer, including a server, a desktop computer, a laptop computer, a tablet computer, etc.

Computer 600 comprises one or more processors (also called central processing units, or CPUs), such as a processor 606. Processor 606 is connected to a communication infrastructure 602, such as a communication bus. In some embodiments, processor 606 can simultaneously operate multiple computing threads. Computer 600 also comprises a primary or main memory 608, such as random access memory (RAM). Main memory 608 has stored therein control logic 624 (computer software), and data.

Computer 600 also comprises one or more secondary storage devices 610. Secondary storage devices 610 comprise, for example, a hard disk drive 612 and/or a removable storage device or drive 614, as well as other types of storage devices, such as memory cards and memory sticks. For instance, computer 600 can comprise an industry standard interface, such a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 comprises a computer useable or readable storage medium 618 (e.g., non-transitory medium) having stored therein computer software 626 (control logic) and/or data. Removable storage unit 616 represents a floppy disk, magnetic tape, compact disk (CD), digital versatile disc (DVD), Blu-ray disc, optical storage disk, memory stick, memory card, or any other computer data storage device. Removable storage drive 614 reads from and/or writes to removable storage unit 616 in a well-known manner.

Computer 600 also comprises input/output/display devices 604, such as touchscreens, LED and LCD displays, keyboards, pointing devices, etc.

Computer 600 further comprises a communication or network interface 620. Communication interface 620 enables computer 600 to communicate with remote devices. For example, communication interface 620 allows computer 600 to communicate over communication networks or mediums 622 (representing a form of a computer useable or readable medium), such as local area networks (LANs), wide area networks (WANs), the Internet, etc. Network interface 620 can interface with remote sites or networks via wired or wireless connections. Examples of communication interface 620 comprise but are not limited to a modem (e.g., for 4G and/or 5G communication(s)), a network interface card (e.g., an Ethernet card for Wi-Fi and/or other protocols), a communication port, a Personal Computer Memory Card International Association (PCMCIA) card, a wired or wireless USB port, etc. Control logic 628 can be transmitted to and from computer 600 via the communication medium 622.

Any apparatus or manufacture comprising a computer useable or readable medium having control logic (software) stored therein is referred to herein as a computer program product or program storage device. Examples of a computer program product comprise but are not limited to main memory 608, secondary storage devices 610 (e.g., hard disk drive 612), and removable storage unit 616. Such computer program products, having control logic stored therein that, when executed by one or more data processing devices, cause such data processing devices to operate as described herein, represent embodiments. For example, such computer program products, when executed by processor 606, can cause processor 606 to perform any of the steps of flowchart 300 of FIG. 3.

Devices in which embodiments can be implemented can comprise storage, such as storage drives, memory devices, and further types of computer-readable media. Examples of such computer-readable storage media comprise a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CD ROMs, DVD ROMs, etc.), zip disks, tapes, magnetic storage devices, optical storage devices, MEMS-based storage devices, nanotechnology-based storage devices, as well as other media such as flash memory cards, digital video discs, RAM devices, ROM devices, and the like. Such computer-readable storage media can store program modules that comprise computer program logic to implement, for example, embodiments, systems, components, subcomponents, devices, methods, flowcharts, steps, and/or the like described herein (as noted above), and/or further embodiments described herein. Embodiments are directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media comprises wireless media such as acoustic, RF, infrared and other wireless media, as well as wired media. Embodiments are also directed to such communication media.

The disclosed technologies can be put into practice using software, firmware, and/or hardware implementations other than those described herein. Any software, firmware, and hardware implementations suitable for performing the functions described herein can be used.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method of modifying an extrusion die comprising a plurality of pins, comprising:
   collecting dimensional data for the plurality of pins with an imaging system comprising a camera, the collecting comprising;
   a) positioning the camera over a target pin,
   b) imaging the target pin with the imaging system;
   c) obtaining dimensional data for the target pin from the image;
   d) appending the dimensional data for the target pin to a program file;
   sequentially repeating steps a), b), c), and d) until dimensional data for each pin of the plurality of pins has been appended to the program file;
   modifying the program file using predetermined process parameters to calculate a tool path; and
   modifying at least one dimensional attribute of at least one pin of the plurality of pins using a machining tool, the machining tool moving a tool device along the tool path.

2. The method of claim 1, wherein the dimensional data of step c) is at least one of coordinates of corners of the target pin, coordinates of a plurality of locations adjacent the corners of the target pin, or coordinates of a plurality of locations along a perimeter edge of the target pin.

3. The method of claim 1, wherein the number of pins of the plurality of pins is less than a total number of pins of the extrusion die.

4. The method of claim 1, wherein the machining tool performs a subtractive machining process.

5. The method of claim 4, wherein the tool device is a cutting bit, a tool-electrode, a water jet nozzle, or a laser source.

6. The method of claim 1, wherein the imaging system comprises a lens optically coupled to the camera and defining an optical axis, the method further comprising illuminating the extrusion die using a first light source directing a first light through the lens substantially parallel to the optical axis.

7. The method of claim 6, further comprising illuminating the extrusion die using a second light source directing a second light at an angle in a range from about 45 degrees to about 75 degrees relative to the optical axis.

8. The method of claim 7, wherein the second light source comprises a ring light.

9. The method of claim 7, wherein the second light source is movable relative to the lens in a direction of the optical axis.

10. The method of claim 1, further comprising measuring a flatness of a discharge surface of the extrusion die.

11. The method of claim 10, wherein the measuring the flatness of the discharge surface comprises calculating a virtual plane using coordinate measurements of a plurality of probed locations on the extrusion die.

12. The method of claim 11, wherein a distance between the imaging system and the extrusion die is calculated using the virtual plane.

13. The method of claim 1, wherein the imaging the target pin comprises identifying a center pin at the center of a field of view of the camera.

14. The method of claim 1, wherein the machining tool comprises a computer numerically controlled machine.

15. The method of claim 1, wherein the predetermined process parameters comprise at least one of a tool device feed rate, finish allowance, radial depth of cut per pass, or axial depth of cut per pass.

16. A method of modifying an extrusion die comprising a plurality of pins, comprising:
   collecting dimensional data for the plurality of pins with an imaging system comprising a camera, the collecting comprising;
   a) positioning the camera over a target pin,
   b) imaging the target pin with the imaging system;
   c) obtaining dimensional data for the target pin from an image obtained from the imaging, and mapping a perimeter shape of the target pin;
   d) appending the dimensional data for the target pin to a program file;
   modifying the program file using predetermined process parameters to calculate a tool path; and
   altering the perimeter shape of the pin using a tool traveling along the calculated tool path.

17. The method of claim 16, further comprising repeating steps a), b), c), and d) for subsequent target pins of the plurality of pins.

18. The method of claim 17, wherein the repeating is continued until dimensional data for each pin of the plurality of pins has been appended to the program file.

19. The method of claim 16, wherein the predetermined process parameters comprise at least one of tool feed rate, finish allowance, radial depth of cut per pass, or axial depth of cut per pass.

20. The method of claim 16, wherein the obtaining dimensional data comprises acquiring a plurality of locations along a perimeter edge of the target pin and interpolating an edge shape between the plurality of locations.

* * * * *